United States Patent
Line

(10) Patent No.: US 10,222,792 B2
(45) Date of Patent: Mar. 5, 2019

(54) DRONE PILOTING DEVICE ADAPTED TO HOLD PILOTING COMMANDS AND ASSOCIATED CONTROL METHOD

(71) Applicant: PARROT DRONES, Paris (FR)

(72) Inventor: Martin Line, Paris (FR)

(73) Assignee: Parrot Drones, Paris (FR)

( * ) Notice: Subject to any disclaimer, the term of this patent is extended or adjusted under 35 U.S.C. 154(b) by 90 days.

(21) Appl. No.: 15/293,772

(22) Filed: Oct. 14, 2016

(65) Prior Publication Data

US 2017/0108857 A1    Apr. 20, 2017

(30) Foreign Application Priority Data

Oct. 19, 2015    (FR) ...................................... 15 59927

(51) Int. Cl.
*G05D 1/00* (2006.01)
*B64C 39/02* (2006.01)
(Continued)

(52) U.S. Cl.
CPC .......... *G05D 1/0016* (2013.01); *A63H 30/04* (2013.01); *B64C 39/024* (2013.01);
(Continued)

(58) Field of Classification Search
None
See application file for complete search history.

(56) References Cited

U.S. PATENT DOCUMENTS 8,473,125 B2 *  6/2013  Rischmuller .......... A63H 27/12
                                                    244/17.13
8,903,568 B1 * 12/2014  Wang .................. G05D 1/0016
                                                        701/2
(Continued)

FOREIGN PATENT DOCUMENTS

EP        2 364 757 A1      9/2011
EP        2 770 400 A1      8/2014
WO        2010061099 A2     6/2010

OTHER PUBLICATIONS

The Written Opinion for the application FR1559927.

*Primary Examiner* — Tamara L Weber
(74) *Attorney, Agent, or Firm* — Haverstock & Owens LLP

(57) ABSTRACT

A device (15) for piloting a drone (10) comprising a touch screen (18) displaying a touch-sensitive area, means for detecting signals emitted by the touch-sensitive area, and means for transforming said detected signals into piloting commands and transmitting said commands to the drone. The device comprises control means, controlled by the touch-sensitive area forming activation/deactivation button, to make the drone piloting mode alternately switch between a mode of activation of the system for holding the last detected commands, mode in which said piloting commands transmitted to the drone result from the transformation of the last detected signals before the switching to the activation mode, and a mode of deactivation of the system for holding the last detected commands, mode in which said piloting commands transmitted to the drone result from the transformation of the current detected signals. The invention also relates to an associated method for controlling a drone.

17 Claims, 2 Drawing Sheets

(51) Int. Cl.
*G06F 3/041* (2006.01)
*G06F 3/0481* (2013.01)
*G06F 3/0484* (2013.01)
*G06F 3/0488* (2013.01)
*A63H 30/04* (2006.01)

(52) U.S. Cl.
CPC ......... *G05D 1/0022* (2013.01); *G05D 1/0038* (2013.01); *G06F 3/0416* (2013.01); *G06F 3/0484* (2013.01); *G06F 3/04817* (2013.01); *G06F 3/04886* (2013.01); *B64C 2201/146* (2013.01); *G06F 2203/04104* (2013.01); *G06F 2203/04105* (2013.01)

(56) References Cited

U.S. PATENT DOCUMENTS

| | | | |
|---|---|---|---|
| 9,090,348 B2 * | 7/2015 | Lesperance | G05D 1/0016 |
| 9,650,155 B2 * | 5/2017 | Wang | B64D 47/08 |
| 2009/0256817 A1 * | 10/2009 | Perlin | G06F 3/0233 |
| | | | 345/174 |
| 2010/0017710 A1 * | 1/2010 | Kim | G06F 3/0414 |
| | | | 715/702 |
| 2011/0288696 A1 * | 11/2011 | Lefebure | A63H 27/12 |
| | | | 701/2 |
| 2012/0280087 A1 * | 11/2012 | Coffman | G05D 1/0016 |
| | | | 244/175 |
| 2014/0374541 A1 | 12/2014 | Wang et al. | |
| 2014/0379178 A1 | 12/2014 | Goossen et al. | |
| 2016/0098168 A1 * | 4/2016 | Lafon | G06F 3/0488 |
| | | | 715/765 |
| 2016/0241767 A1 * | 8/2016 | Cho | H04N 5/23203 |

* cited by examiner

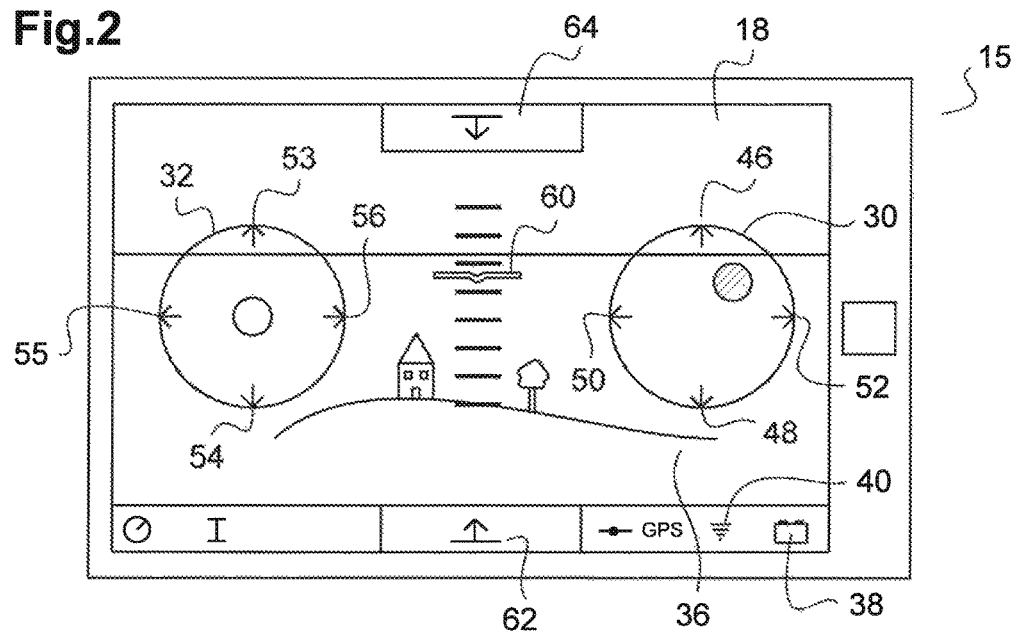
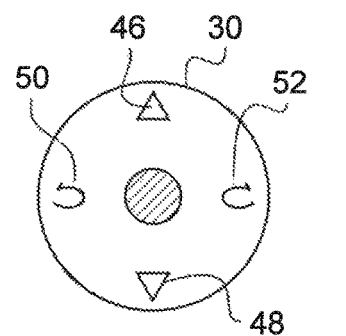
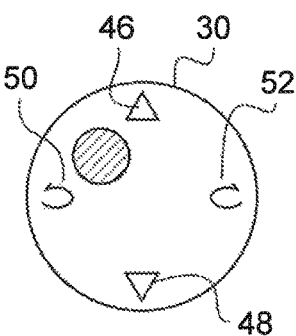
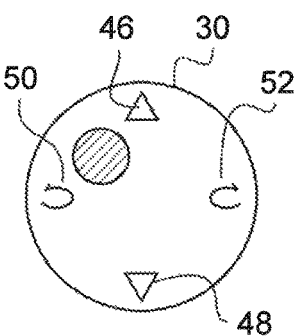
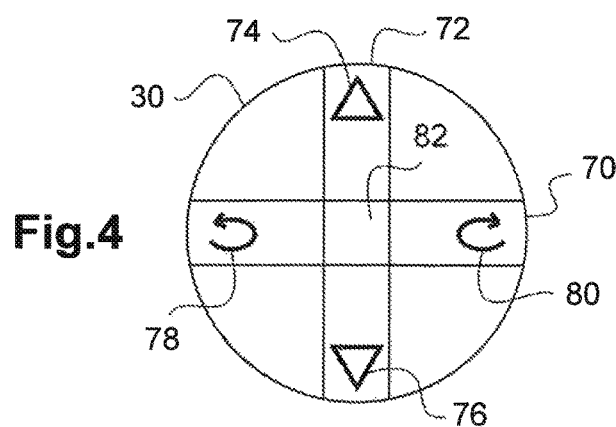

DRONE PILOTING DEVICE ADAPTED TO HOLD PILOTING COMMANDS AND ASSOCIATED CONTROL METHOD

The invention relates to the devices for piloting a drone and the method for piloting a drone.

The AR.Drone 2.0, the Bebop Drone of Parrot SA, Paris, France, or the eBee of SenseFly SA, Swiss, are typical examples of drones. They are equipped with a series of sensors (accelerometers, 3-axis gyrometers, altimeters) and may include at least one camera. These drones are provided with one or several rotors driven by respective motors, able to be controlled in a differentiated manner in order to pilot the drone in attitude and speed. These drones are provided with a system of automatic stabilization in hovering flight, whose principle is described in the document WO 2009/109711 (Parrot).

These drones are piloted by the user through a remote piloting device, connected to the drone by a radio link such as a wireless link of the Wi-Fi (IEEE 802.11) or Bluetooth (registered trademarks) local network type.

The drone may be piloted by means of a piloting device comprising a touch screen, wireless emitter/receiver means, as well as two-axis inclination sensors forming sensors of attitude of the apparatus casing with respect to a reference vertical linked to a terrestrial reference system. The screen of the apparatus reproduces the image of the on-board front camera, transmitted through the wireless link, and various piloting and command symbols are superimposed to this image so as to allow an activation of these commands by contact of the user's finger on the touch screen. The user has in fact at his disposal two different piloting modes, activatable at will.

The first piloting mode, hereinafter called the "auto-piloted mode" is the default piloting mode, and it implements the system of automatic and autonomous stabilization of the drone. In other words, this mode allows the drone to be stabilized in a position in flight, with no vertical nor horizontal displacement.

The second piloting mode, hereinafter called the "reactive mode" is a mode in which the piloting of the drone is operated more directly by the user, by means of a combination: on the one hand, of signals emitted by the apparatus inclination sensor: for example, to make the drone move forward, the user inclines his apparatus according to the corresponding pitch axis, and to move the drone aside to the right or to the left, he inclines this same apparatus with respect to the roll axis; and on the other hand, of commands available on the touch screen, in particular "move-up/down" (corresponding to a gas control) and "right turn/left turn" (pivoting of the drone about a yaw axis).

The switching from the auto-piloted mode to the reactive mode is made by pressing the finger on a specific symbol displayed on the touch screen. The pressing of the finger on this symbol causes the immediate activation of the reactive mode, which remains activated as long as the contact of the finger is held at this place. The piloting is then obtained by inclinations of the apparatus and/or the handling of the "move-up/down" and "right turn/left turn" symbols displayed on the touch screen.

The auto-piloted mode (for example, implemented as described in the above-mentioned WO 2009/109711) is activated as soon as the user removes his finger from the corresponding symbol.

Another document WO 2010/061099 describes a drone piloting device provided with a piloting-casing inclination sensor and a touch panel. The drone is provided with a system of autonomous stabilization in hovering flight in the absence of any command from a user. For that purpose, the device comprises means forming activation/deactivation button to make the drone piloting mode alternately switch to a mode of activation/deactivation of the drone autonomous stabilization system.

These ways of proceeding allow a perfectly efficient and intuitive piloting; they however suffer from limitations.

In particular, one of the limitations lies in the fact that such a piloting device does not allow holding a same piloting command continuously so as to maintain the drone according to a particular displacement.

Indeed, to maintain, for example, the curve of displacement of a drone, it is necessary for the drone user to hold the displacement command on the piloting device, i.e. to hold the inclination of the piloting device as well as the contact of the fingers on the touch screen with no move of the user during the time necessary for the drone to achieve the desired curve.

Such a holding of the hand positions on a piloting device without moving is extremely difficult and very uncomfortable for the user. Moreover, it is to be noted that the smallest displacement of the piloting device or of the hands causes an irregular displacement of the drone. Consequently, during the making of a video sequence, the video then undergoes an irregular displacement visible by the human eye.

The object of the invention is to remedy these various drawbacks, by proposing a drone piloting device such as that described in the above-mentioned WO 2009/109711 or WO 2010/061099 allowing the drone displacement to be maintained according to a regular displacement without the user has to hold the piloting device and the contact on the touch screen in a same position.

For that purpose, the invention proposes a device for piloting a drone comprising:
  a touch screen displaying at least one touch-sensitive area,
  means for detecting signals emitted by said at least one touch-sensitive area,
  means for transforming said detected signals into piloting commands and transmitting these piloting commands to the drone.

Characteristically, the device comprises control means, controlled by said touch-sensitive area forming activation/deactivation button, to make the drone piloting mode alternately switch between
  a mode of activation of the system for holding the last detected commands, mode in which said piloting commands transmitted to the drone result from the transformation of the last detected signals before the switching to the activation mode, and
  a mode of deactivation of the system for holding the last detected commands, mode in which said piloting commands transmitted to the drone result from the transformation of the current detected signals.

According to various subsidiary characteristics:
  the device comprises means for detecting a level of pressure applied to the touch-sensitive area,
  when the detected level of pressure is higher than a predetermined level of pressure, said control means switch the piloting mode from the mode of deactivation of the system for holding the last detected commands to the mode of activation of holding of the last detected commands.

The invention has also for object a method for controlling a drone, from a piloting device comprising
  a touch screen displaying at least one touch-sensitive area, means adapted to detect at least one contact of a user's finger on the surface of the signals emitted by said at least one touch-sensitive area, means for transforming said detected signals into piloting commands, and transmitting these piloting commands to the drone, this method including the activation of piloting commands by contact and/or displacement of the finger at the place of corresponding piloting symbols displayed on the screen.

Characteristically, the method comprises a control step, controlled by said touch-sensitive area forming activation/deactivation button, to make the drone piloting mode alternately switch between a mode of activation of the system for holding the last detected commands, mode in which said piloting commands transmitted to the drone result from the transformation of the last detected signals before the switching to the activation mode, and a mode of deactivation of the system for holding the last detected commands, mode in which said piloting commands transmitted to the drone result from the transformation of the current detected signals.

According to various advantageous subsidiary characteristics of this method:

the method further comprises the following steps:
displaying on the screen a piloting icon,
detecting the finger contact at any point of contact of at least one predefined area of the screen;
detecting said finger displacement in the predefined area;
upon detection of said displacement, analysing the direction and/or amplitude and/or speed of said displacement with respect to the position of the piloting icon and sending a piloting command as a function of the result of said analysis.

the step of displaying a piloting icon on the screen comprises displaying said icon at said point of contact of the finger.

the method further comprises a step of detecting a level of pressure applied to the touch-sensitive area, and if the detected level of pressure is higher than a predetermined pressure threshold, then the control step implements the mode of activation of the system for holding the last detected commands.

the predetermined pressure threshold is calculated based on the mean pressure exerted on the touch-sensitive area since the finger contact detection.

the method further comprises a step of detecting the duration of the pressure applied to the touch-sensitive area when the pressure is higher than a predetermined pressure threshold and if the detected level of pressure is higher than a predetermined pressure threshold and the detected duration of pressure is higher than a predetermined duration threshold, then the control step implements the mode of activation of the system for holding the last detected commands.

the symbol displayed on the screen comprises a horizontal area defining a first pair of commands and a vertical area defining a second pair of commands,
if the detected level of pressure is higher than a predetermined pressure threshold and if the detected pressure is made on one of said areas, then the control step implements the mode of activation of the system for holding the last detected command relating to said area on which the pressure is detected.

when the step of detecting at least one contact of a finger detects at least two contacts of the finger at a substantially identical place in a time interval lower than a predetermined duration, then the control step implements the mode of activation of the system for holding the last detected commands.

when the selected control mode is the mode of activation of the system for holding the last detected commands, the method switches to the mode of deactivation of the system for holding the last detected commands upon detection of a level of pressure applied to the screen higher than a predetermined threshold.

An example of implementation of the present invention will now be described with reference to the appended drawings.

FIG. 2 is an example showing a piloting device according to the invention.

Figure 1:
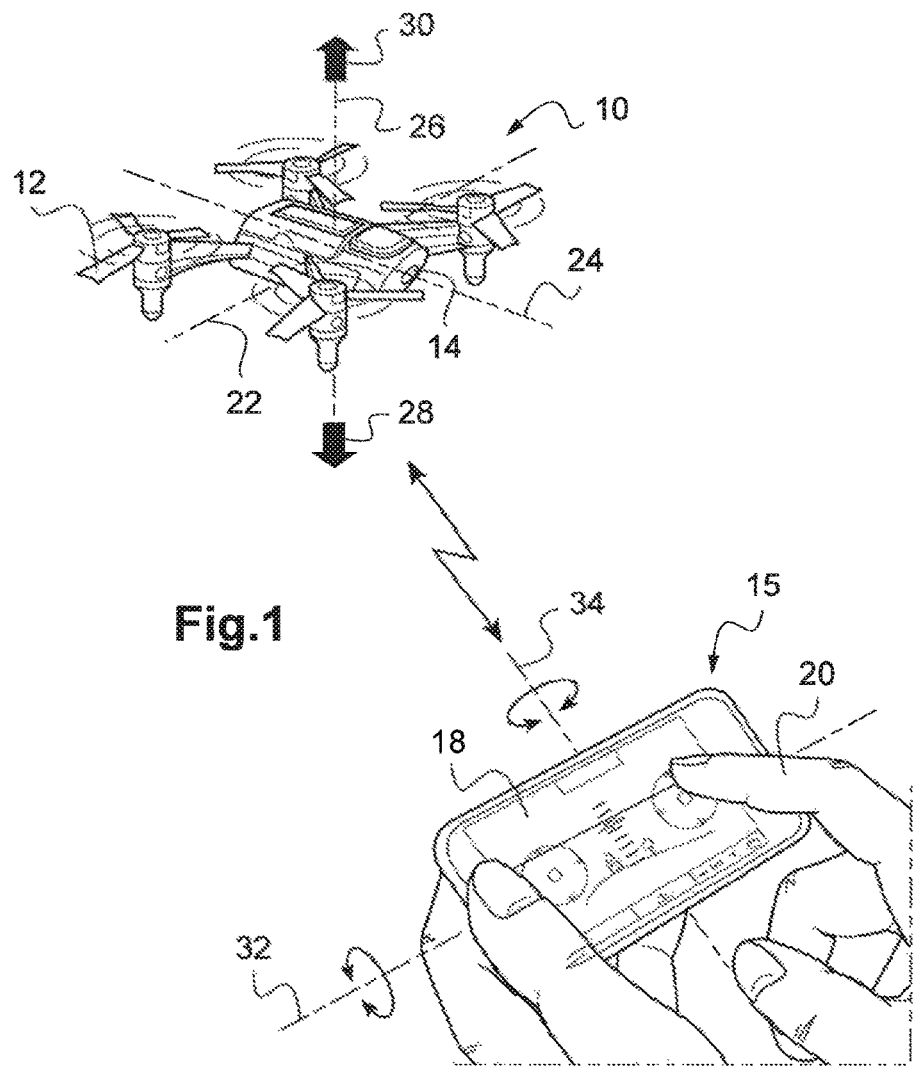
FIG. 1 is an overall view showing the drone and the associated piloting device allowing the piloting thereof.

FIGS. 3a, b and c illustrate a piloting icon at the beginning of the piloting, during the piloting and when the user has locked the piloting command.

FIG. 4 illustrates a particular embodiment of a piloting icon according to the invention.

An exemplary embodiment will now be described.

In FIG. 1, the reference 10 generally denotes a drone. According to the example illustrated in FIG. 1, it is a drone of the quadricopter type, such as the Bebop Drone model of Parrot SA, Paris, France.

According to another exemplary embodiment, it is a sailwing such as the eBee model of SenseFly SA, Swiss.

A quadricopter drone includes four coplanar rotors 12 whose motors are piloted independently from each other by an integrated system of navigation and control of attitude. The drone 10 also includes a front camera 14 allowing to obtain an image of the scene towards which the drone is directed.

According to an exemplary embodiment, the drone is provided with inertial sensors (accelerometer and gyrometer) making it possible to measure with a certain accuracy the angular speeds and the attitude angles of the drone, i.e. the Euler angles (pitch $\varphi$, roll $\theta$ and yaw $\psi$) describing the inclination of the drone with respect to a horizontal plane of a fixed terrestrial system UVW, it being understood that the two longitudinal and transversal components of the horizontal speed are closely linked to the inclination following the two respective pitch and roll axes.

The drone may be provided with a system of autonomous stabilization in hovering flight in the absence of any command from the user. This system described, for example in the above-mentioned WO 2009/109711, allows in particular bringing the required corrections to maintain the equilibrium of the fixed point by suitable trimming commands, i.e. commands of correction of the variations of translation due to the external effects such as the displacement of air and the drift of the sensors. The displacement of the drone is defined as a displacement from a stable state to another stable state, the corresponding change of the fixed point being operated by autonomous commands. The system of autonomous stabilization in hovering flight consists in controlling the drone at a fixed point.

The drone 10 is piloted by a remote piloting device 15, such as a touchscreen multimedia telephone or tablet having integrated accelerometers, for example a cellular phone of the iPhone type (registered trademark) or else, or a tablet of the iPad type (registered trademark) or else. It is a standard device, not modified except the loading of a specific applicative software to control the piloting of the drone 10. According to this embodiment, the user controls in real time the displacement of the drone 10 via the piloting device 15.

The remote piloting device is an apparatus provided with a touch screen 18 displaying the image captured by the camera 14 on-board the drone 10, with, in superimposition, a certain number of symbols allowing the activation of commands by simple contact of the user's finger on the touch screen.

The piloting device communicates with the drone 10 via a bidirectional exchange of data by a wireless link of the Wi-Fi (IEEE 802.11) or Bluetooth (registered trademarks) local network type: from the drone 10 to the piloting device 15 in particular for the transmission of the image captured by the camera, and from the piloting device 15 to the drone 10 for the sending of piloting commands.

The piloting of the drone 10 consists in making it evolve by:
a) rotation about a pitch axis 22, to make it move forward or rearward; and/or
b) rotation about a roll axis 24, to move it aside to the right or to the left; and/or
c) rotation about a yaw axis 26, to make the main axis of the drone, and hence the pointing direction of the front camera and the direction of progression of the drone, pivot to the right or to the left; and/or
d) translation downward 28 or upward 30 by changing the gas control, so as to reduce or increase, respectively, the altitude of the drone.

When these piloting commands are applied directly by the user from the piloting device 15 (so-called "reactive mode" piloting), the commands a) and b) of pivoting about the pitch 22 and roll 24 axes are obtained intuitively by inclination of the piloting device 15 about the longitudinal axis 32 and the transversal 34, respectively: for example, to make the drone move forward, it is just necessary to incline the apparatus forward about the axis 32, to move it aside to the right it is just necessary to incline the apparatus to the right about the axis 34, etc.

The commands c) and d) result from actions applied by contact of a finger 20 of the user on one or several corresponding specific areas of the touch screen 18.

FIG. 2 illustrates the different images and symbols displayed on the screen 18 of the piloting device 15.

The display 18 reproduces the scene 36 captured by the front camera 14 of the drone, with, in superimposition on this image, a certain number of symbols 30 to 64 that are displayed to deliver information about the operation of the drone, and to allow, by touch activation, the sending of the corresponding piloting commands.

Hence, in superimposition on the captured scene 36 visualized on the screen 18 of the piloting device, are illustrated two piloting icons 30 and 32. However, according to an alternative embodiment, only one piloting icon 30 or 32 may be positioned on the screen above the captured scene displayed.

The apparatus hence displays in 38 information about the state of the battery and in 40 the signal level of the link between the apparatus and the drone.

For the reactive-mode piloting, the user has further at his disposal, in addition to the commands generated by inclinations of the apparatus, touch commands inserted in one or several touch-sensitive areas illustrated in part by the piloting icons 30 and 32 with, in particular, arrows for Move-up 46/Move-down 48 and for Left yaw turn 50/Right yaw turn 52, and arrows for Move forward 53 and Move reward 54 and for translation Aside to the left 55 and Aside to the right 56 in the piloting icons 30 and 32.

The user has also at his disposal the display of a collimator 60 giving the pointing direction of the on-board camera, and hence of the main axis of the drone.

Various additional symbols are also provided, such as the automatic takeoff/landing command in 62, and the triggering of an emergency procedure in 64.

According to a particular embodiment, the inclinations of the piloting device are detected, for example, by means of a device inclination sensor.

Moreover, the piloting device comprises means for detecting signals emitted by one or several touch-sensitive areas of the screen 18 upon a contact by a user.

In the corresponding particular embodiment, the means for detecting signals also detect the signals emitted by the inclination sensor.

The detected signals are transformed by means for transforming these signals into piloting commands. These means also allow transmitting the piloting commands to the drone.

By "piloting commands", it is meant all the instructions emitted to the drone, in particular relating to move-up or move-down instruction and/or a right or left turn instruction according to a given angle and/or an instruction of horizontal displacement to the left or the right, etc.

In FIG. 2, two piloting icons 30 and 32 are shown, which are positioned in a first touch-sensitive area on the right of the screen 18 and in a second touch-sensitive area on the left of the screen 18, respectively, of the piloting device 15.

However, according to another embodiment, the contact of the user's finger on any point of a touch-sensitive area of the screen with allow the display of a piloting icon 30 or 32 at the finger contact place. In particular, the piloting icon will be centred about the point of contact of the user's finger.

According to this embodiment, the contact of the finger at any point of the area of the touch screen will produce the following actions:
 reading the data of the apparatus inclination sensors, to determine the inclination thereof (position according to the two pitch 32 and roll 34 axes with respect to the absolute vertical in a terrestrial reference system) at the time when the finger comes into contact, and defining this position as the new neutral position for the latter application inclination commands,
 displaying the icon under the user's finger,
 providing piloting commands under the user's finger, for example move-up/move-down and left turn/right turn commands.

This state lasts as long as the finger remains pressed on the area, still or in motion.

As soon as the finger contact is released, the reverse actions with respect to the preceding ones are executed.

When the user releases the finger from the screen, the piloting device 15 emits a command for positioning the drone in hovering flight.

According to the invention, the drone piloting device further comprises control means, controlled by one or several touch-sensitive areas forming activation/deactivation button, to make the drone piloting mode alternately switch between:
 a mode of activation of the system for holding the last detected commands, mode in which said piloting commands transmitted to the drone result from the transformation of the last detected signals before the switching to the activation mode, and
 a mode of deactivation of the system for holding the last detected commands, mode in which said piloting commands transmitted to the drone result from the transformation of the current signals detected on the piloting device 15.

These control means control for example the switching from a deactivated mode to an activated mode of the system for holding the last detected commands, allow the user to control the piloting device so that the latter hold the last detected piloting commands before the switching to the activation mode without having to maintain the piloting device in a given inclination nor a holding of the user's fingers on the screen 18 of the piloting device 15.

The holding of the last detected commands also allows the drone to continue regularly along its direction, for example to make a turn with no interruption nor irregularity.

These control means activating the system for holding the last detected command may be modified so as to switch to a deactivated mode of the command holding system, allowing the user to take back the control of the drone piloting.

Such a piloting device 15 comprises a drone control method, which comprises a control step, controlled by said touch-sensitive area forming activation/deactivation button, to make the drone piloting mode switch alternately between:

a mode of activation of the system for holding the last detected commands, mode in which said piloting commands transmitted to the drone result from the transformation of the last detected signals before the switching to the activation mode, and a mode of deactivation of the system for holding the last detected commands, mode in which said piloting commands transmitted to the drone result from the transformation of the current detected signals.

The method comprises a step of detecting the finger contact at any contact point in at least one predefined touch-sensitive area of the screen and of detecting the displacement of the finger in the predefined touch-sensitive area.

Moreover, the method comprises displaying on the screen 18 at least one piloting icon 30, 32. The displaying of the piloting icon is made either by superimposition with the captured scene 36 or by mixing of the piloting icon with the captured scene.

According to a first embodiment of displaying one or several piloting icons, this displaying is made at a fixed and determined location on the screen 18 of the piloted device 15.

According to an alternative embodiment, the displaying of a piloting icon is made upon detection of the contact of a finger of the user on the screen 18 of the piloting device 15, in particular centrally with respect to the detected point of contact.

Based on the signals detected due to the contact of the finger on the screen 18, the method analyses the direction and/or the amplitude and/or the speed of said displacement with respect to the position of the piloting icon and sends piloting commands as a function of the result of this analysis.

According to a particular embodiment of the invention, the method further comprises a step of detecting a level of pressure applied by the user's finger to the touch-sensitive area of the screen 18.

For that purpose, the piloting device 15 comprises means for detecting a level of pressure applied to the touch-sensitive area of the screen 18 of the device 15.

If the detected level of pressure is higher than a predetermined pressure threshold, then the control step switches from a first mode of operation of the command holding system to the second mode of operation of the command holding system. For example, the control step switches from the deactivated mode of the system for holding the last detected commands to the activated mode of the system for holding the last detected commands before the switching to the activated mode.

Hence, the detection of a high pressure, in particular higher than a predetermined level, on the touch-sensitive area of the screen is analysed as a command of switching the mode of operation, i.e. activated or deactivated, of the system for holding the last detected commands before the switching to the activated mode.

A detected pressure higher than a predetermined level causes for example the activation of the system for holding the last detected commands before the switching to the activation mode and hence a locking of the last commands asked by the user just before the switching of the activation mode, so that the drone continues its displacement according to the last commands asked by the user and detected by the piloting device 15. The user may then release the pressure applied to the touch-sensitive area of the piloting device and let the drone evolve according to the last detected commands. The drone hence continues its current displacement until the user takes back the control of the drone displacement on the piloting device 15.

As illustrated in FIGS. 3a to 3c, a piloting icon 30 is shown as displayed on the screen 18 of the piloting device 15 during the use by a user.

FIG. 3a illustrates the display on the screen 18 of a piloting icon 30 at the point of contact of the finger on the touch-sensitive area. Indeed, the grey circle corresponds to the point of contact of the finger, the icon being positioned centrally with respect to the position of contact of the finger. The piloting icon comprises for example a "move-up" order 46, a "move-down" order 48, a "left yaw turn" order 50 and a "right yaw turn" order 52. As illustrated in FIG. 3b, in order to pilot the drone, the user moves his finger in the piloting icon 30, for example to the top left as illustrated by the grey circle. According to this new position of the finger, the piloting device 15 will generate commands allowing making the drone move up and simultaneously making it turn to the left. Hence, the drone executes a slight turn to the left while gaining altitude.

In order to hold these piloting commands, the user exerts by means of his finger a higher pressure on the touch-sensitive area of the screen of the piloting device at the place of the piloting commands he wants to lock so that these piloting commands continue to be applied to pilot the drone.

In order to visualize the held piloting commands, a visual indicator is shown on the piloting icon, as illustrated in FIG. 3c and in FIG. 2, for example, a hatched circle illustrating the held commands is shown at the place where the pressure of the finger has been exerted.

Upon implementation of the activated mode of the system for holding the last detected commands before the switching to the activation mode, the corresponding piloting commands are regularly sent to the drone as long as the activated mode of holding of the piloting command is selected. That way, the drone continues its displacement in a continuous and regular way.

According to an alternative embodiment, a specific command is sent to the drone so as to indicate thereto that the last commands sent must be held until receipt of another command. Hence, according to this alternative embodiment, the piloting device sends a single command and not a multitude of identical commands.

As discussed hereinabove, when a level of pressure exerted on the touch-sensitive area is higher than a predetermined pressure threshold, the method of piloting switches from the deactivated mode of the system for holding the last detected commands to the mode of activation of the system for holding the last detected commands before the switching to the activation mode.

According to a particular embodiment, the predetermined pressure threshold is calculated based on the mean pressure exerted by the user on the touch-sensitive area of the screen since the detection of the finger contact on the screen, in particular on the touch-sensitive area.

According to a particular embodiment, the method comprises a step of detecting a level of pressure applied to a touch-sensitive area of the screen and a step of comparing this level of pressure with a predetermined level of pressure, this step being followed with a step of detecting an absence of contact of said finger on the screen intervening substantially after the application of a high level of pressure in order to switch from the deactivated mode of the system for holding the last detected commands to the activated mode of the system for holding the last detected commands before the switching to the activation mode.

According to the exemplary embodiment, the user applies a high pressure on the touch-sensitive area of the screen followed with a removal of the finger from the screen in order to switch from the deactivated mode to the activated mode of holding of the last detected commands.

According to a second embodiment, the method of piloting comprises a step of detecting the duration of the finger pressure on the touch-sensitive area of the screen when the level of pressure is higher than a predetermined threshold. If the detected level of pressure of the finger on the touch-sensitive area is higher than a predetermined pressure threshold and if the detected duration of pressure is higher than a predetermined duration threshold, then the control step implements the mode of activation of the system for holding the last detected commands before the switching to the activation mode.

According to this second embodiment, it is detected a strong pressure applied on the touch-sensitive area of the screen as well as the holding of this high pressure during a given duration. The strong pressure applied to the touch-sensitive area of the screen during a given duration causes a command of switching of the piloting mode from the deactivated mode of the system for holding the last detected commands to the activated mode of the system for holding the last detected commands before the switching to the activation mode.

With reference to FIGS. 3b and c, the switching from the piloting mode in which the command holding system is deactivated to the piloting mode in which the system for holding the last detected commands is activated is performed by the detection of a determined level of pressure on the touch-sensitive area of the screen during a predetermined duration. The predetermined duration is of several milliseconds, for example 50 milliseconds.

According to a third embodiment, the icon 30 displayed on the screen comprises a predefined horizontal area 70 defining a first pair of commands and a predefined vertical area 72, defining a second pair of commands such as illustrated for example in FIG. 4. The first pair of commands defines for example a "left yaw turn" order 78 and a "right yaw turn" order 80 and the second pair of commands defines for example a "move-up" order 74 and a "move-down" order 76.

According to this embodiment, the method detects on the one hand the pressure exerted by the user on the touch-sensitive area of the screen and on the other hand the location in the icon of this pressure, in particular if the pressure is exerted in the predefined horizontal area 70 of in the predefined vertical area 72. Hence, if the detected level of pressure is higher than a predetermined pressure threshold and if the detected pressure is made on one of the predefined areas 70, 72, then the control step implements the mode of activation of the system for holding the last detected commands relating to one of the predefined areas 70 or 72, so as to lock a pair of commands corresponding to the predefined area in which the high pressure has been detected, the user keeping the control of the drone displacement according to the non-locked second pair of commands.

According to this embodiment, when the user pilots the drone, he places at least one finger on the touch-sensitive area of the screen. The piloting icon is then displayed under the user's finger. In particular, the central part 82 of the piloting icon appears under the user's finger.

Then, the user moves his finger on the touch-sensitive area of the screen so as to control the drone, for example to control a gain in altitude, to perform a turn, etc. When the user applies on the touch-sensitive area of the screen by means of his finger a pressure higher than a predetermined pressure threshold, then the method detects the place of the finger pressure point.

If the place of the point of pressure is located in the predefined vertical area 74 or in the predefined horizontal area 72, as illustrated in FIG. 4, then only the respective pair of commands of the predefined area in which the pressure is exerted will be held, or locked. In other words, there will be a switching of the deactivated mode of the command holding system to the activated mode of the system for holding the pair of last detected commands before the switching to the mode of activation corresponding to the area on which has been made the pressure.

Hence, for example, if the pressure of the user's finger is made in the predefined horizontal area 70, then the last detected commands corresponding to the commands of displacement of the drone according to a right or left yaw turn and according to a particular degree, will be held and the user keeps the control of the drone piloting according to the second pair of commands, i.e. the possibility to control the altitude of the drone and the speed of such a displacement.

According to a fourth embodiment, the method according to the invention detects the application of at least two successive contacts of the user's finger at a substantially identical place on the touch-sensitive area of the screen and then switches the piloting mode from the deactivated mode of the system for holding the last detected commands to the activated mode of the system for holding the last detected commands before the switching to the activation mode.

According to this embodiment, the user controls the piloting of the drone by displacement of his finger on a touch-sensitive area of the screen then will remove his finger from the screen and apply again a contact on the screen so that the method detects the multiple touch of the finger on the screen. Upon such a detection, the piloting mode according to the mode of activation of the system for holding the last detected commands is implemented, the last detected commands corresponding to the commands determined relative to the position of the user's finger on the touch-sensitive area of the screen just before the switching to the activated mode.

According to an exemplary embodiment, the time interval between the last application of the finger on the touch-sensitive area of the screen and the next touch of the finger is lower than 0.5 second so that the method detects a multiple touch on the screen.

According to a particular embodiment, when the user performs a multiple touch, then the commands considered as the last detected commands correspond to the commands determined as regards the position of the finger in the touch-sensitive area of the screen before the execution of the successive touches.

In order to switch the piloting mode from the activated mode of the system for holding the last detected commands to the deactivated mode of the system for holding the last detected commands, the method must detect for example a level of pressure applied on the screen higher than a predetermined pressure threshold.

Hence, the user, wanting to take back the drone control, applies on the screen a pressure higher than a predetermined pressure threshold.

The invention claimed is:

1. A device (15) for piloting a drone (10) comprising:
 a touch screen (18) displaying at least one touch-sensitive area,
 means for detecting signals emitted by said at least one touch-sensitive area,
 means for transforming said detected signals into piloting commands resulting from the transformation of currently detected signals, and transmitting said piloting commands to the drone,
 control means, controlled by said touch-sensitive area forming activation/deactivation button, to make the drone piloting mode alternately switch between
  a first piloting mode and
  a second piloting mode,
 means for maintaining lastly detected commands, wherein said piloting commands transmitted to the drone result from the transformation of currently detected signals, said lastly detected commands being those commands resulting from signals detected before a switch to said first piloting mode, and
 means for detecting a level of pressure applied to the touch-sensitive area, wherein when the detected level of pressure is higher that a predetermined level of pressure, said control means switch the piloting mode from the second piloting mode to the first piloting mode,
wherein said first piloting mode is a mode for activating said means for maintaining lastly detected commands, and said second piloting mode is a mode for deactivating said means for maintaining lastly detected commands,
and wherein, upon activation of said means for maintaining said lastly detected commands, the lastly detected commands are regularly sent to the drone as long as the first mode is activated.

2. A method for controlling a drone (10), from a piloting device (15) comprising
 a touch screen (18) displaying at least one touch-sensitive area,
said method comprising:
 a step of detecting at least one contact of a user's finger on a surface of the at least one touch-sensitive area,
 a step of transforming currently detected signals into piloting commands, and transmitting said piloting commands to the drone, and
 a step of activation of piloting commands by contact and/or displacement of the finger at a place of corresponding piloting symbols displayed on the touch screen, and
 a control step, controlled by said touch-sensitive area forming activation/deactivation button, to make the drone piloting mode alternately switch between
  a first piloting mode, and
  a second piloting mode,
wherein said method further comprises:
 a step of maintaining lastly detected commands, said lastly detected commands being those commands resulting from signals detected before a switch to said first piloting mode,
 a step of detecting a level of pressure applied to the touch-sensitive area, and if the detected level of pressure is higher than a predetermined pressure threshold, then the control step implements the first piloting mode,
wherein said first piloting mode is a mode for activating said maintaining lastly detected commands and said second piloting mode is a mode for deactivating said maintaining lastly detected commands,
and wherein, upon said activating said maintaining lastly detected commands, the lastly detected commands are regularly sent to the drone as long as the first mode is activated.

3. The method for controlling a drone according to claim 2, characterized in that the method further comprises the following steps:
 displaying on the touch screen (18) a piloting icon (30, 32),
 detecting the finger contact at any point of contact of at least one predefined area of the touch screen;
 detecting said displacement of said finger in the predefined area;
 upon detection of said displacement of said finger, analysing the direction and/or amplitude and/or speed of said displacement of said finger with respect to the position of the piloting icon and sending a piloting command as a function of the result of said analysis.

4. The method for controlling a drone according to claim 3, characterized in that the step of displaying a piloting icon on the touch screen comprises displaying said icon at said point of contact of the finger.

5. The method for controlling a drone according to claim 4, characterized in that the method further comprises a step of detecting a level of pressure applied to the touch-sensitive area, and if the detected level of pressure is higher than a predetermined pressure threshold, then the control step implements the first piloting mode.

6. The method for controlling a drone according to claim 4, characterized in that, when the step of detecting at least one contact of a finger detects at least two contacts of the finger at a substantially identical place in a time interval lower than a predetermined duration, then the control step implements the first piloting mode.

7. The method for controlling a drone according to claim 3, characterized in that, when the step of detecting at least one contact of a finger detects at least two contacts of the finger at a substantially identical place in a time interval lower than a predetermined duration, then the control step implements the first piloting mode.

8. The method for controlling a drone according to claim 3, characterized in that the method further comprises a step of detecting a level of pressure applied to the touch-sensitive area, and if the detected level of pressure is higher than a predetermined pressure threshold, then the control step implements the first piloting mode.

9. The method for controlling a drone according to claim 2, characterized in that the predetermined pressure threshold is calculated based on the mean pressure exerted on the touch-sensitive area since the finger contact detection.

10. The method for controlling a drone according to claim 9, characterized in that the method further comprises a step of detecting the duration of the pressure applied to the touch-sensitive area when the pressure is higher than a predetermined pressure threshold and if the detected level of pressure is higher than a predetermined pressure threshold and the detected duration of pressure is higher than a predetermined duration threshold, then the control step implements the first piloting mode.

11. The method for controlling a drone according to claim 9, characterized in that a symbol displayed on the touch screen comprises a horizontal area defining a first pair of commands and a vertical area defining a second pair of commands,
  if the detected level of pressure is higher than a predetermined pressure threshold and if the detected pressure is made on one of said areas, then the control step implements the first piloting mode relating to said area on which the pressure is detected.

12. The method for controlling a drone according to claim 2, characterized in that the method further comprises a step of detecting the duration of the pressure applied to the touch-sensitive area when the pressure is higher than a predetermined pressure threshold and if the detected level of pressure is higher than a predetermined pressure threshold and the detected duration of pressure is higher than a predetermined duration threshold, then the control step implements the first piloting mode.

13. The method for controlling a drone according to claim 12, characterized in that a symbol displayed on the touch screen comprises a horizontal area defining a first pair of commands and a vertical area defining a second pair of commands,
  if the detected level of pressure is higher than a predetermined pressure threshold and if the detected pressure is made on one of said areas, then the control step implements the first piloting mode relating to said area on which the pressure is detected.

14. The method for controlling a drone according to claim 2, characterized in that a symbol displayed on the touch screen comprises a horizontal area defining a first pair of commands and a vertical area defining a second pair of commands,
  if the detected level of pressure is higher than a predetermined pressure threshold and if the detected pressure is made on one of said horizontal area and said vertical area, then the control step implements the first piloting mode relating to said area on which the pressure is detected.

15. The method for controlling a drone according to claim 2, characterized in that, when the selected control mode is the first piloting mode, the method switches to the second piloting upon detection of a level of pressure applied on the touch screen higher than a predetermined threshold.

16. A device (15) for piloting a drone (10) comprising:
  a touch screen (18) displaying at least one touch-sensitive area,
  means for detecting signals emitted by said at least one touch-sensitive area,
  means for transforming said detected signals into piloting commands resulting from the transformation of currently detected signals, and transmitting said piloting commands to the drone,
  control means, controlled by said touch-sensitive area forming activation/deactivation button, to make the drone piloting mode alternately switch between
    a first piloting mode and
    a second piloting mode, and
  means for maintaining lastly detected commands, wherein said piloting commands transmitted to the drone result from the transformation of currently detected signals, said lastly detected commands being those commands resulting from signals detected before a switch to said first piloting mode, and
  means for detecting a level of pressure applied to the touch-sensitive area, wherein when the detected level of pressure is higher that a predetermined level of pressure, said control means switch the piloting mode from the second piloting mode to the first piloting mode,
wherein said first piloting mode is a mode for activating said means for maintaining lastly detected commands, and said second piloting mode is a mode for deactivating said means for maintaining lastly detected commands,
and wherein, upon activation of said means for maintaining said lastly detected commands a specific command is sent to the drone so as to indicate to the drone that the lastly detected commands sent to the drone must be held until receipt of another command.

17. A method for controlling a drone (10), from a piloting device (15) comprising a touch screen (18) displaying at least one touch-sensitive area, said method comprising:
  a step of detecting at least one contact of a user's finger on a surface of the at least one touch-sensitive area,
  a step of transforming currently detected signals into piloting commands, and transmitting said piloting commands to the drone, and
  a step of activation of piloting commands by contact and/or displacement of the finger at the place of corresponding piloting symbols displayed on the touch screen, and
  a control step, controlled by said touch-sensitive area forming activation/deactivation button, to make the drone piloting mode alternately switch between
    a first piloting mode, and
    a second piloting mode,
wherein said method further comprises:
  a step of maintaining lastly detected commands, said lastly detected commands being those commands resulting from signals detected before a switch to said first piloting mode,
  a step of detecting a level of pressure applied to the touch-sensitive area, and if the detected level of pressure is higher than a predetermined pressure threshold, then the control step implements the first piloting mode,
wherein said first piloting mode is a mode for activating said maintaining lastly detected commands and said second piloting mode is a mode for deactivating said maintaining lastly detected commands,
and wherein, upon said activating said maintaining of lastly detected commands a specific command is sent to the drone so as to indicate to the drone that the lastly detected commands sent to the drone must be held until receipt of another command.

* * * * *